(12) United States Patent
Gavish

(10) Patent No.: US 8,784,217 B2
(45) Date of Patent: Jul. 22, 2014

(54) WIDGET MANAGEMENT SYSTEM AND METHOD OF OPERATING THEREOF

(75) Inventor: Roei Gavish, Rishon Lezion (IL)

(73) Assignee: Playtech Software Limited, Douglas (IM)

( * ) Notice: Subject to any disclaimer, the term of this patent is extended or adjusted under 35 U.S.C. 154(b) by 0 days.

(21) Appl. No.: 13/570,923

(22) Filed: Aug. 9, 2012

(65) Prior Publication Data

US 2013/0065691 A1 Mar. 14, 2013

Related U.S. Application Data

(60) Provisional application No. 61/645,187, filed on May 10, 2012, provisional application No. 61/521,796, filed on Aug. 10, 2011.

(51) Int. Cl.
*A63F 9/24* (2006.01)
(52) U.S. Cl.
USPC .............................................. 463/42; 463/31
(58) Field of Classification Search
USPC ...................................... 463/25, 42; 709/217
See application file for complete search history.

(56) References Cited

U.S. PATENT DOCUMENTS

| | | | | |
|---|---|---|---|---|
| 7,886,072 | B2 * | 2/2011 | Wormington et al. | 709/231 |
| 8,317,622 | B2 * | 11/2012 | Gura et al. | 463/42 |
| 2004/0248645 | A1 * | 12/2004 | Blackburn et al. | 463/25 |
| 2007/0168463 | A1 * | 7/2007 | Rothschild | 709/217 |
| 2009/0249282 | A1 | 10/2009 | Meijer et al. | |
| 2011/0136569 | A1 | 6/2011 | Gura | |
| 2011/0159966 | A1 | 6/2011 | Gura et al. | |

\* cited by examiner

*Primary Examiner* — Masud Ahmed
(74) *Attorney, Agent, or Firm* — Oliff PLC

(57) ABSTRACT

A widget manager configured for managing at least one widget process, the widget manager comprising a processing module, a widget interface and a service interface operatively coupled to each other, wherein said at least one widget process is configured to run as a part of a client process, said client process configured to communicate with a game platform and/or parts therein via a client communication channel; wherein the widget interface is configured to enable communication between said at least one widget process and a game process which is configured to run as a part of said client process independently from the widget process; and wherein the service interface is configured to enable communication between said at least one widget process and the game platform and/or parts therein.

15 Claims, 7 Drawing Sheets

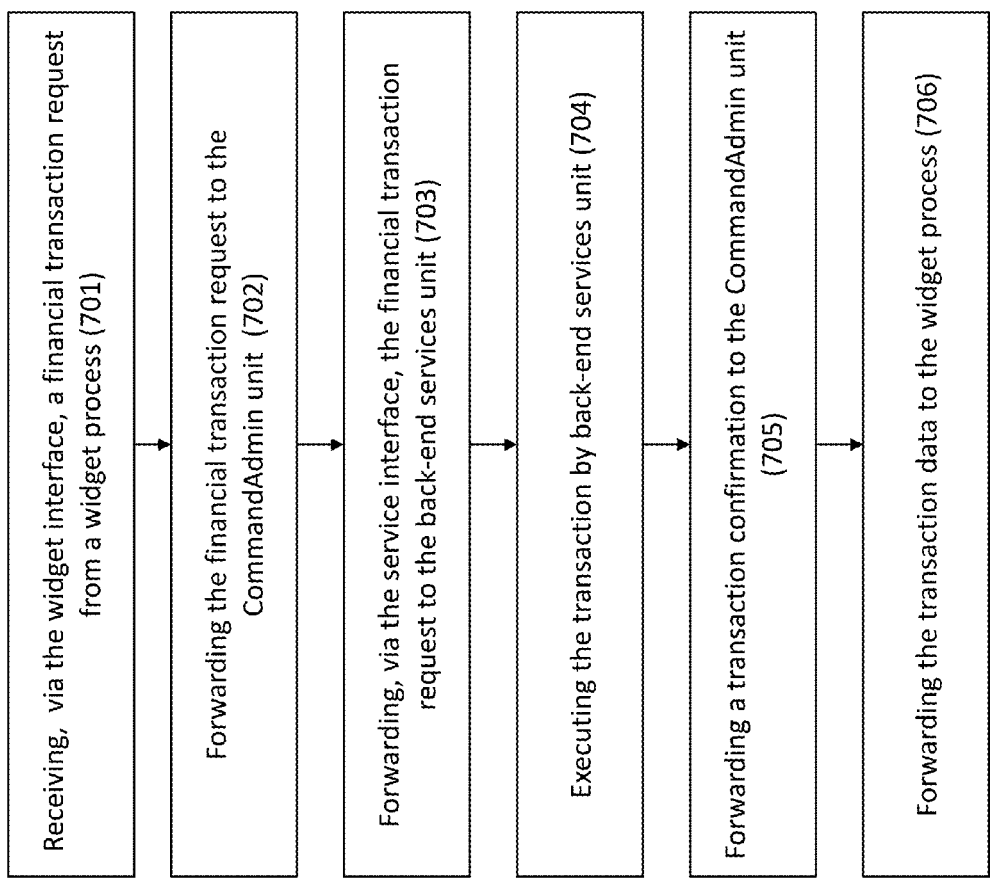

WIDGET MANAGEMENT SYSTEM AND METHOD OF OPERATING THEREOF

CROSS-REFERENCES TO RELATED APPLICATIONS

This application relates to and claims priority from U.S. Provisional Patent Application No. 61/521,796, filed on Aug. 10, 2011 and U.S. Provisional Patent Application No. 61/645,187, filed on May 10, 2012, both applications incorporated herein by reference in their entirety.

FIELD

The presented subject matter generally relates to computerized gaming, and more particularly to managing widgets in computerized games.

BACKGROUND

Widgets are an increasingly popular technology. Widgets or gadgets are mini applications that afford a limited set of information and/or functionality. A typical widget comprises metadata (e.g., XML), code (e.g., JavaScript), and a user interface (e.g., HTML). The metadata provides widget configuration information such as an identifier, name, version, description, and author, among other things. The code specifies functionality associated with a widget, and the user interface provides a mechanism to present data to and receive data from a user.

Widgets can be implemented in computerized games in various ways known in the art as disclosed, for example, in the following patent applications:

US Patent Application No. 2011/159966 discloses a method comprising: validating a request to establish a data feed between a wagering game machine in a wagering game establishment and a server of an online social community against data import/export rules of a wagering game establishment; establishing the data feed through a data liaison associated with the online social community and a data import/export controller of the wagering game establishment in accordance with the data import/export rules; and expurgating units of the data feed in accordance with the import/export rules while maintaining the data feed and maintaining obscurity of the wagering game machine from the online social community server. A request that originates from an online social community or a derivative of the online social community can be a widget created for and/or distributed from an online social community.

US Patent Application No. 2011/136569 discloses a method and apparatus for generating wagering games. The method comprises: analyzing code of a wagering game to determine one or more aesthetic assets, one or more wagering game presentation engines, and game logic of the wagering game; generating an executable re-usable code for each of the one or more aesthetic assets to indicate the one or more aesthetic assets in an environment different than an electronic wagering game machine environment; generating an executable re-usable code for each of the one or more wagering game presentation engines to implement the one or more wagering game presentation engines in the environment different than the electronic wagering game machine environment; and generating an executable re-usable code that implements the game logic in the environment different than the electronic wagering game machine environment.

US Patent Application No. 2009/249282 discloses mechanisms for supporting cross platform widgets. A generic widget can be converted into a specialized widget of a corresponding platform. Dually, a specialized widget can be generalized to a generic widget for subsequent deployment on the same or different host. Furthermore, support is provided for compositional widgets across platforms.

SUMMARY

In accordance with certain aspects of the presently disclosed subject matter, there is provided a widget manager configured for managing at least one widget process. The widget manager comprises a processing module, a widget interface and a service interface operatively coupled to each other. The at least one widget process is configured to run as a part of a client process, said client process configured to communicate with a game platform and/or parts therein via a client communication channel. The widget interface is configured to enable communication between said at least one widget process and a game process which is configured to run as a part of said client process independently from the widget process. The service interface is configured to enable communication between said at least one widget process and the game platform and/or parts therein.

In accordance with further aspects of the presently disclosed subject matter, the service interface can be configured to enable communication between said at least one widget process and the game platform via said client communication channel. The widget interface can be configured to enable communication between said at least one widget process and said game process using publish/subscribe events, wherein the game process is configured to act as a publisher and the widget process is configured to act as a subscriber. The service interface can be configured to enable communication between said at least one widget process and the game platform and/or parts therein using request/respond commands, wherein the widget process is configured to act as a requester and the game platform and/or parts therein are configured to act as an executor.

The widget interface can comprise at least one application programming interface (API) selected from a group comprising: pull API configured to enable asking and/or calling certain functionality; push API configured to enable registering on one or more predefined events; get API configured to enable the widget process requesting information related to the game process; and set API configured to enable the widget process to transfer commands via the service interface.

The service interface can comprise at least one application programming interface selected from a group comprising: command API configured to send and receive real time commands related to financial transactions associated with the widget process; secured channel API configured to enable communication with the game platform and/or parts therein via a secure channel; and real time channel API configured to enable communication with the game platform and/or parts therein via a real time channel.

In accordance with other aspects of the presently disclosed subject matter, there is provided a method of managing a client process which runs on a processing unit and communicates with a game platform and/or parts therein via a client communication channel. The method comprises: running a game process as a part of said client process; running at least one widget process as a part of said client process, wherein said at least one widget process runs independently from the game process; communicating between said at least one widget process and said game process merely via a widget interface accessible by said game process and said at least one widget process; and communicating between said at least one widget process and said game platform and/or parts therein via said client communication channel.

In accordance with further aspects of the presently disclosed subject matter, communicating between said at least one widget process and said game process can be provided using publish/subscribe events, and wherein the game process acts during communicating as a publisher and said at least one widget process acts during communicating as a subscriber.

In accordance with further aspects of the presently disclosed subject matter, communicating between said at least one widget process and the game platform and/or parts therein can be provided using request/respond commands, and wherein said at least one widget process acts during communicating as a requester and the game platform and/or parts therein act during communicating as one or more executors. Communicating between said at least one widget process and the game platform and/or parts therein can comprise sending and receiving real time commands related to financial transactions associated with the widget process. This communicating can be provided via a secure channel and/or via a real time channel.

Among advantages of certain embodiments of the disclosed subject matter is providing the third-party widget developers with a Software Development Kit (SDK) including an Application Programming Interface (API), thus enabling integration with the game infrastructure, including using the back-end services unit for financial transactions and user management related to the widget applications.

BRIEF DESCRIPTION OF THE DRAWINGS

In order to understand the disclosure and to see how it can be carried out in practice, embodiments will now be described, by way of non-limiting example only, with reference to the accompanying drawings, in which:

FIG. 7 is a generalized flowchart of the widget-related transaction process in accordance with certain embodiments of the presently disclosed subject matter.

DETAILED DESCRIPTION OF EMBODIMENTS

Figure 1:
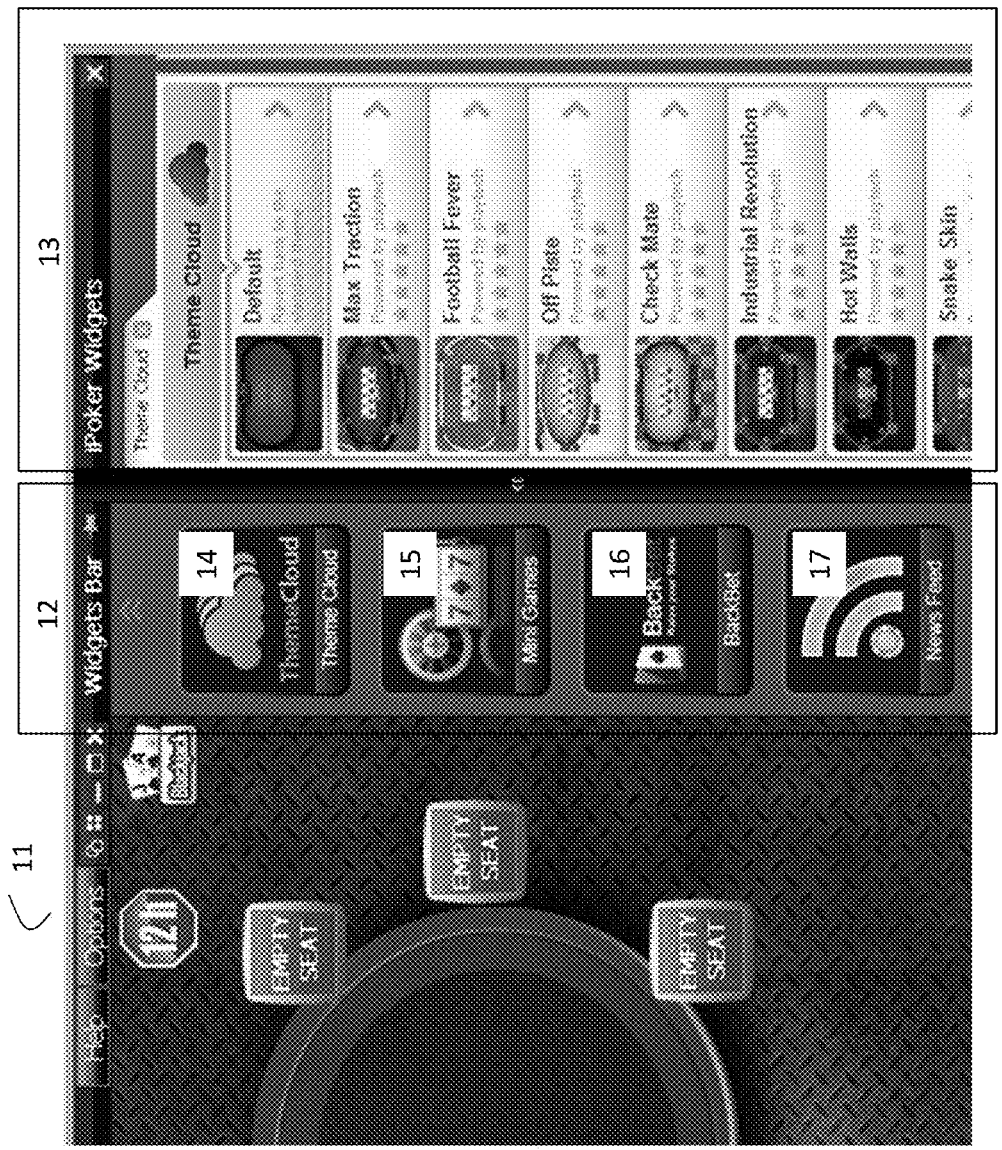
FIGS. 1 and 2 illustrate a non-limiting example of a client screen in accordance with the presently disclosed subject matter.

In the following detailed description, numerous specific details are set forth in order to provide a thorough understanding of the presented subject matter. However, it will be understood by those skilled in the art that the presented subject matter can be practiced without these specific details. In other instances, well-known methods, procedures, components and circuits have not been described in detail so as not to obscure the presented subject matter. In the drawings and description, identical reference numerals indicate those components that are common to different embodiments or configurations.

Unless specifically stated otherwise, as apparent from the following discussions, it is appreciated that throughout the specification discussions utilizing terms such as "processing", "analyzing", "calculating", "matching", "generating", "setting", "configuring" or the like, refer to the action and/or processes of a computer that manipulate and/or transform data into other data, said data represented as physical, e.g. such as electronic, quantities and/or said data representing the physical objects. The term "computer" should be expansively construed to cover any kind of electronic device with data processing capabilities.

The operations in accordance with the teachings herein can be performed by a computer specially constructed for the desired purposes or by a general-purpose computer specially configured for the desired purpose by a computer program stored in a computer readable storage medium.

In addition, embodiments of the presently disclosed subject matter are not described with reference to any particular programming language. It will be appreciated that a variety of programming languages can be used to implement the teachings of the presently disclosed subject matter.

The references cited in the Background teach many principles of implementing and managing widgets in computerized games that are applicable to the presented subject matter. Therefore the full contents of these publications are incorporated by reference herein for appropriate teachings of additional or alternative details, features and/or technical background.

Bearing this in mind, attention is drawn to FIG. 1 illustrating a non-limiting example of a client screen representing a part of poker/casino table 11, widget manager user interface (UI) 12 and a widget container 13. The widget manager UI is configured to present the available widgets and to enable launching, activating and managing thereof. The widgets can be presented to a player as a part of a widget store accessible via the widget manager user interface. The widgets can be dragged & dropped to the widget bar interface, sorted, searched, rated, etc.

By way of non-limiting example, the illustrated widget manager UI presents a theme cloud widget 14 (an application enabling external change of iPoker table themes by the players); a mini-games widget 15 (application providing a selection of flash-based side games); a Back Bet widget 16 (a side betting application allowing players to put side bets on upcoming cards and to make insurance bets and hedge betting plays); and a News Feed widget 17.

A widget is a customizable mini-application that displays continuously updated information and allows performing tasks without opening a new window. For example, game-related widgets can enable displaying to a player a poker calculator, tracker information, poker headlines and other applications that will prove useful to players or the network over time. Examples of non-game play applications can include music applications, advertising, social applications (e.g., player-to-player chat), maintenance applications, Internet applications, non-display related applications (i.e., applications that run but that do not display content), etc.

The widget manager user interface 12 provides a way to organize widgets to allow the player quick access, without, for example, cluttering the poker/casino table. The widget manager interface can be located on any side of the poker/casino table.

Figure 2:

After activation, a widget can be launched onto the widgets container 13 and, embedded on a dedicated own TAB, each widget can run as a separate process. A non-limiting example of the widget container with activated theme cloud widget and news feed widgets is illustrated in FIG. 2.

Figure 3:
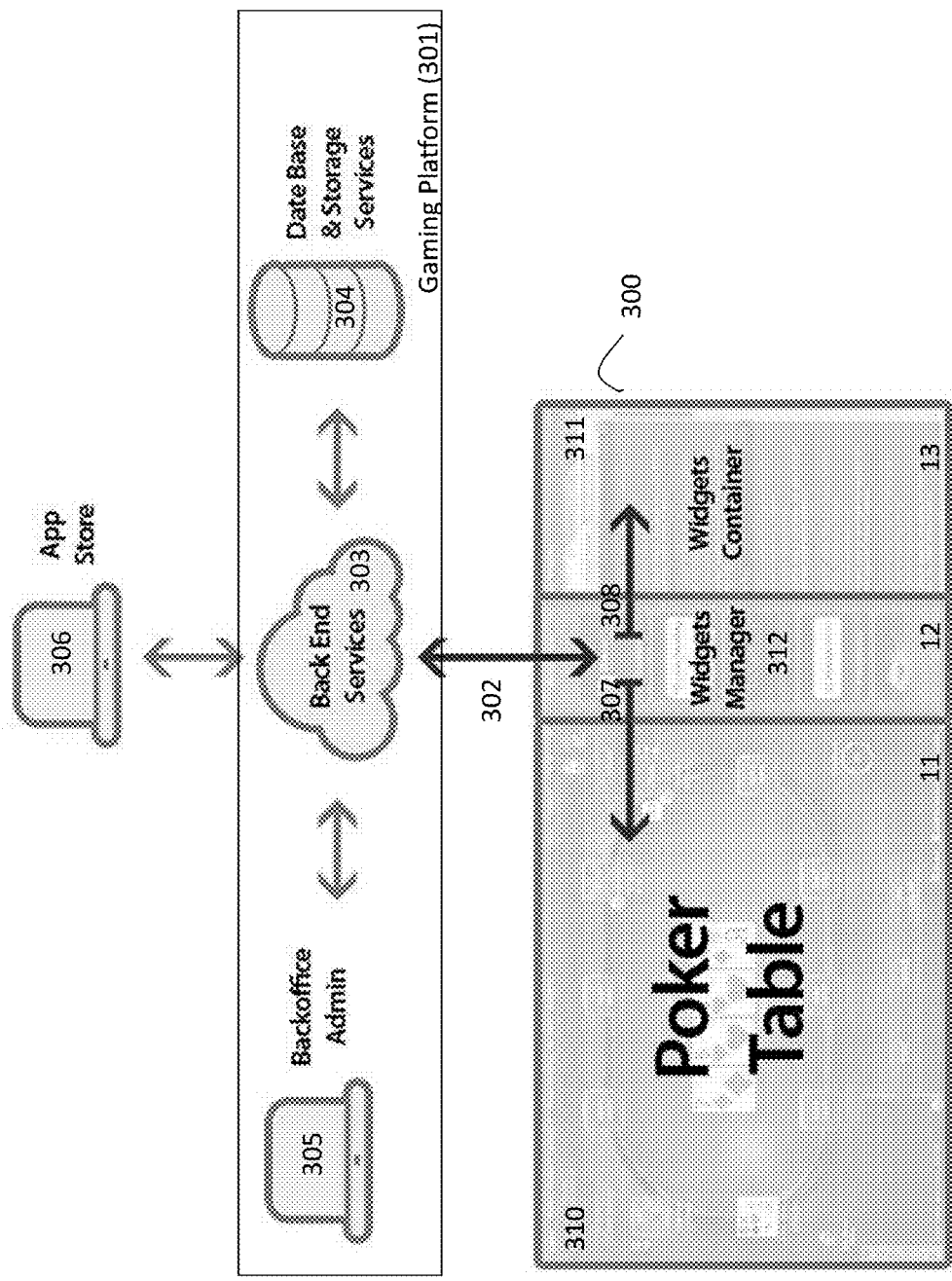
FIG. 3 illustrates a generalized game environment in accordance with certain embodiments of the presently disclosed subject matter.

FIG. 3 illustrates a generalized game environment in accordance with certain embodiments of the presently disclosed subject matter.

The illustrated game network environment comprises a client 300 operatively coupled to a gaming platform 301 via a bi-directional client communication channel 302. Any device having input and display capabilities (e.g. personal computer, workstation, PDA, mobile phone, WebTV device, wagering machine, adaptive gaming machine, etc.) and capable to communicate with the game platform 301 directly or via a communication network, can serve as the client 300. Optionally, such a device can further have a video capturing capabilities device and/or audio output capabilities. A process running on the client in communication with the game platforms or parts thereof is referred to hereinafter as a client process.

In certain embodiments of the presently disclosed subject matter, the client process comprises a game process 310 (illustrated as running at poker table 11) capable to execute at least part of a gaming application. In certain embodiments of the presently disclosed subject matter, there can be provided an exchange of live video/audio inputs between the game process running as a part of the client process") and the game platform. A part of the respective display capabilities can be reserved for showing a video image of the other players and/or dealer.

The game platform 301 comprises a gaming server (not shown) configured to receive input data from one or more game processes, to execute logic of one or more certain games accordingly, and to report outcome(s) to the game processes in accordance with gaming principles and rules. The gaming server can be configured as a server-side gaming application, wherein each game process can be configured to execute the corresponding client-side of the game. The sharing of gaming functions between the game server and the game processes can vary depending on the game and implementation thereof, for example the game process can provide only functions of input/output and/or additionally execute certain programs related to output graphics and/or additionally execute part or all programs related to a game logic and exchange the data with the game server, etc. It will be appreciated that the servers and/or the clients can alternatively be implemented as any suitable combination of software, firmware and hardware.

The game platform further comprises operatively coupled back-end services unit 303, a database and storage unit 304 and a back-office administration unit 305. The database and storage unit 304 are configured to accommodate all necessary information related to the games and users, including configuration of the game server (e.g. available games, game limits, etc.), users data and profiles, subscription management data and subscribers management (e.g. data related to opening an account for a user, dosing an account, allowing a user to add or withdraw funds from an account, changing the user's address or personal identification number, etc.), session histories, detailed game results, monetary transactions, statistical data, etc. By way of non-limiting example, user-related data can include the user's name, address, age, gender, marital status, number of children, salary, occupation, hobbies and preferences or any other personal data. Additionally, user-related data can include data related to the gaming of certain users, for example, number and sums of wagers during the former week, favorite fields of games, sum of money won, bonuses, etc.

The back-end unit 303 is configured to accommodate and to manage user accounts, and to enable performing of monetary transactions in accordance with received data/commands.

The gaming platform can further comprise other servers (not shown) (e.g. security server, live game server, etc.). These servers can be configured to exchange data with the back-end unit, back-office unit, database and storage unit, etc.

In accordance with certain embodiments of the currently presented subject matter, upon activating a widget, the client process 300 can further run at least one widget process 311 (illustrated as running onto the widget container 13). The widget processes run independently from the game process 310 and are managed by a widget manager 312, with the widget manager user interface 12 detailed with reference to FIGS. 1-2.

The widget manager is operatively connected to the game process 310 via a game communication link 307 and to the widget process(es) 311 via a widget communication link 308. The game process 310 communicates with the game platform 301 (and/or units therein) via the client communication channel 302 in any appropriate manner of client-server communication known in the art. The widget manager 312 communicates with the game platform 301 (and/or units therein) via the same client communication channel 302 using the socket connection of the game process. Optionally, the widget manager can communicate with the game platform (and/or units therein) via a dedicated channel (not shown). The widget process(es) 311 communicate with the game process and/or the game platform (and/or units therein) via the widget manager.

Optionally, the game platform can further comprise user-management unit and/or widget services unit and/or other units dedicated to the widgets. Alternatively or additionally, all or part of the units comprised in the game platform can serve both for the game and for the widget applications.

Thus, the widget manager enables communication between the game process and the running widget process(es) as well as communication between the running widget process(es) and the existing game infrastructure (e.g. back-end unit, back-office administration unit, etc.). Communication between the running widget process(es) and the existing game infrastructure can be provided by using the socket connection (via the client communication channel 302) established for the game process.

The widget manager 312 further provides control and security functions related to the widgets. By way of non-limiting example, such functions include:
 Secured buffering enabling verification of widgets API request;
 Providing permissions for API requests (which set of APIs is permitted for each specific widget);
 Preventing installation of unpermitted widgets;
 Collecting and transferring all widgets and user activities;
 Maintaining downloading the widgets published in the widget application store 306;
 Updating the widgets with no need of updating the gaming process;
 Controlling user notifications and other functions.

Optionally, the communication functions (or part thereof) of the widget manager can be implemented as Application Programming Interfaces (APIs) used for integration between a new widget and the game.

Figure 4:
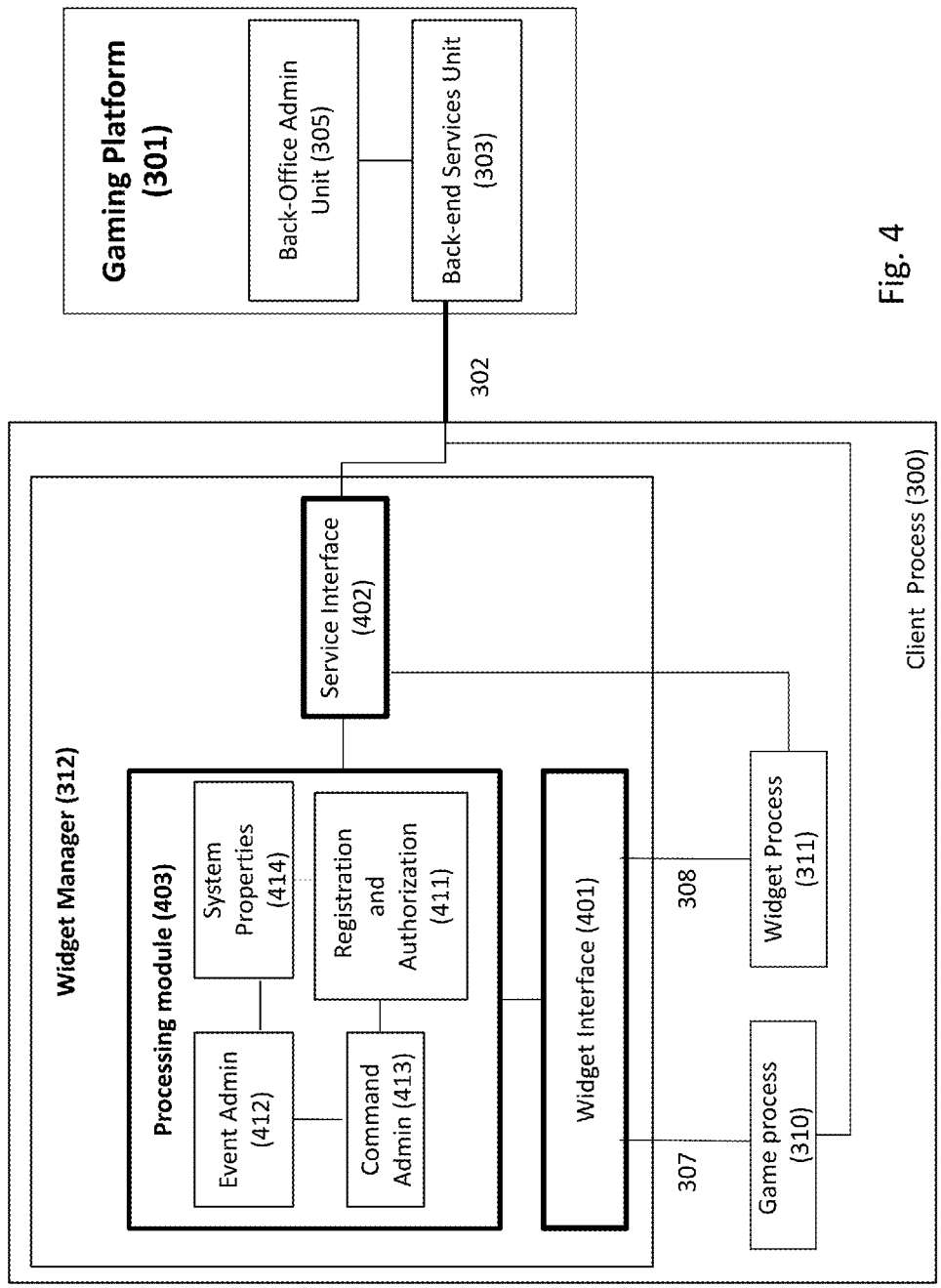
FIG. 4 illustrates a widget manager in accordance with certain embodiments of the presently disclosed subject matter.

Referring to FIG. 4, there is illustrated the widget manager in accordance with certain embodiments of the presently disclosed subject matter. The widget manager comprises a processing module 403 operatively coupled to a widget interface 401 and a service interface 402. The widget interface 401 is configured to enable all necessary communication between game and widget processes independently running as parts of the client process. The widget interface is connectable with the game process via the link 307 and with the widget process via the link 308. The widget interface can be further configured to enable necessary communication between the widgets and the service interface. Optionally, the widget process can communicate to the service interface directly, without involvement of the widget interface.

The widget interface 401 can comprise a client API module (not shown) supporting push/pull and get/set API options. By way of non-limiting example the module can include:
  pull API operating by asking or calling certain functionality (e.g. a request for current stack size);
  push API operating by registering on an events or a listener that regularly sends information from game process to widgets. (e.g. listen to dealer chat);
  get API operating by enabling widgets to ask for information related to the game process (e.g. get pot size, get player nickname, get last hand played moves, etc.);
  set API operating by enabling widgets to transfer commands via service interface 402 and communication channel 302 to update data (e.g. charge bankroll for $1 or set avatar).

The service interface 402 is configured to enable communication of the widget process(es) and/or widget manager with the gaming platform (and/or parts therein) and, optionally, with the widget application store 306 (FIG. 3). The communication with the application store can be provided via the gaming platform or directly via a dedicated link (not shown).

Among functions enabled by the service interface are:
  providing and managing access to the back office admin unit 305;
  providing and managing access to the widgets apps store 306;
  managing widgets downloading and updating;
  enabling maintaining players' accounts widgets information;
  providing and managing access to the back-end unit 303 and controlling micro-transaction activities for the widgets;
  providing and managing access to DB and storage unit 304 for widgets use.

The service interface 402 can comprise a service API module (not shown). By way of non-limiting example, the service API module can include:
  command API operating by sending and receiving real time commands to and from the back-end services unit;
  secured channel API;
  real time channel API and others.

Thus, in accordance with certain embodiments of the presently disclosed subject matter, the widget manager can provide third-party widget developers with a Software Development Kit (SDK) including Application Programming Interfaces (APIs), enabling integration with the game platform, including using the back-end unit for financial transactions and user management related to the widget.

Note that the presented subject matter is not bound by the specific architecture described with reference to FIGS. 3-4 and, likewise, is applicable to any network architecture facilitating computerized online gaming. The presented subject matter is not bound by the illustrated configuration of the widget manager and/or the game platform; equivalent functionality can be consolidated or divided in another manner. In different embodiments, the functional units and/or parts thereof can be placed in a single or in multiple geographical locations (including duplication for high-availability); operative connections between the units and within the units can be implemented directly or indirectly, including remote connection. The presented subject matter can also be practiced in distributed computing environments.

The processing module 403 (referred to hereinafter also as "processor") comprises a registration/authorization unit 411, an EventAdmin unit 412, CommandAdmin unit 413 and a system properties unit 414; the units are operatively connected to each other. The processing module can further comprise additional units, such as for example, a data base unit. The units are configured to enable operation further detailed with reference to FIGS. 5-7.

The registration/authorization unit 411 is operable to verify registration/authorization requests related to the widgets. The system properties unit 414 is configured to enable a player to personalize the widget look and feel properties via the widget manager user interface 12.

Figure 5B:
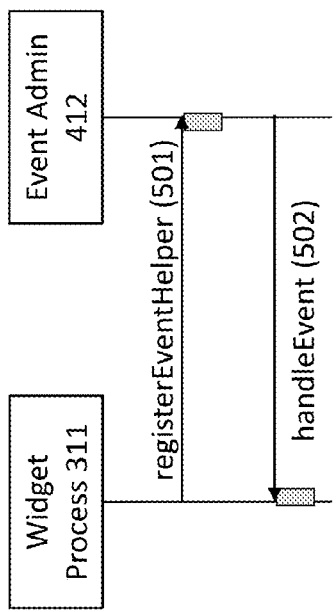
FIGS. 5a-5c schematically illustrate a Publish/Subscribe model and examples thereof.
Figure 5C:
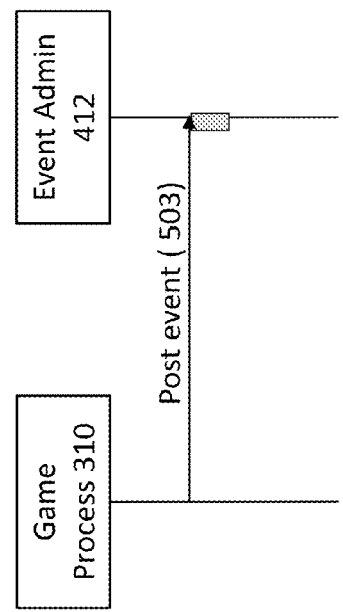
Figure 5A:
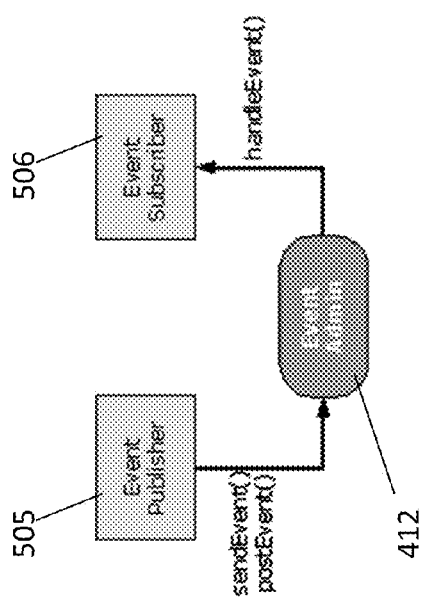

EventAdmin unit 412 is operable to enable a Publish/Subscribe model of handling events schematically, illustrated in FIG. 5a. The Event Admin unit 412 dispatches events between Event Publisher 505 (game process) and Event Subscribers 506 (widget processes) by interposing an event channel. Publishers post events to the channel and the event channel defines which handlers need to be notified. Thus, publishers and subscribers have no direct knowledge of each other, which simplifies event management.

EventAdmin unit 412 handles a subscription list that indicates a list of specific widgets and data sources that subscribe to events associated with the game process running (the event publisher) as a part of the client process, The subscription lists can be specified, or categorized, so that some widgets and/or data sources request data for only certain event types. Each event can be defined by at least two criteria: an event topic and event properties. The event type assists in matching the event with the appropriate widget process (the event subscriber), while the event properties can be based on any of a number of criteria including, but not limited to, application types, subject matter types, number of events, times of day, player types, player settings, etc.

Optionally, EventAdmin unit 412 can analyze information associated with the event data (e.g., analyze descriptive tags embedded in event data, analyze event metadata, analyze data associated with player accounts that initiate the events, etc.) to determine event types. The EventAdmin unit 412 can then provide the event data to the widgets that may be interested in the determined event types.

The Event Admin unit 412 determines which Event Subscribers 506 have been registered for the specified topic at the time the event has been posted. There are two major types of publishing the events: synchronous and asynchronous. Asynchronous event publishing is used in case when it is irrelevant for the Event Publisher 505 in which order the Event Subscribers 506 will receive and process a specific event. For asynchronous events, the EventAdmin 412 unit sends notifications of the next events relevant for a given Event Subscriber 506 without waiting for successful notification of all respective Event Subscribers 506 about a previous event. When a synchronous event publishing is used, the EventAdmin unit 412 finds all Event Subscribers 506 subscribed to a certain event, and notifies each one in turn. The EventAdmin unit sends the notification of a next event only after each interested Event Subscriber 506 is successfully notified of this certain event.

Events sequence diagrams presented in FIGS. 5b-5c schematically illustrate non-limiting examples of the publish-subscribe model. In the registration process illustrated in FIG. 5b, the widget process 311 (the subscriber) registers (501) at the EventAdmin unit 412 for its requested topic (for example, on cards-related events); and thereafter it "listens" (502) for respective upcoming events. In the publishing process illustrated in FIG. 5e, the game process 310 (the publisher) uses the EventAdmin unit to post/send (503) events. The EventAdmin unit 412 delegates the event to the appropriate Subscriber (Widget Process 311).

Figure 6:
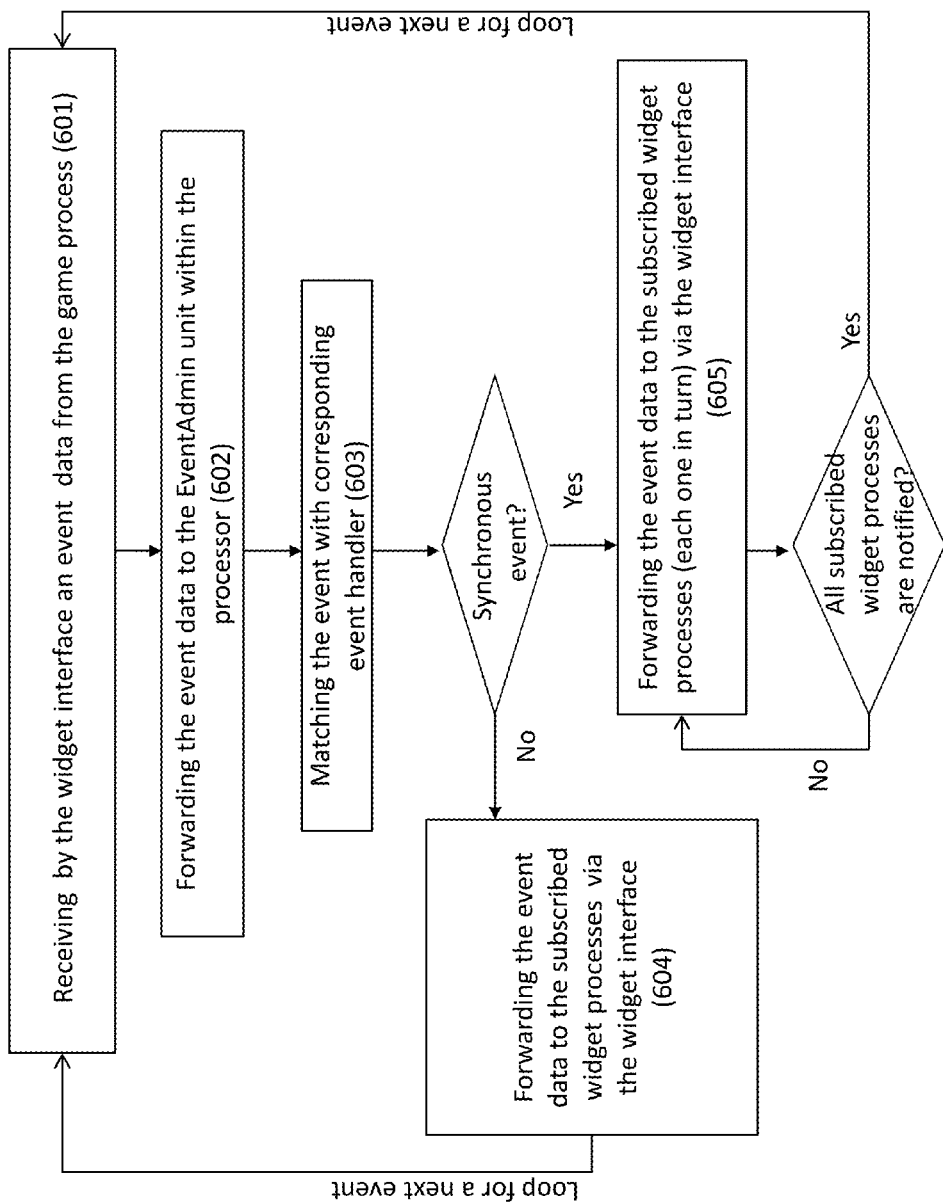
FIG. 6 illustrates a generalized flowchart of the event management process in accordance with certain embodiments of the presently disclosed subject matter.

Referring now to FIG. 6, there is provided a generalized flowchart of the event management process. Upon successful registration and authorization, the widget process 311 is subscribed to certain events associated with the game process 310 independently running as a part of the same client process 300. When a subscribed event occurs, corresponding event data is received (601) by the widget interface 401 from the game process 310 and forwarded (602) to the EventAdmin unit 412. EventAdmin unit 412 defines the topic and the properties of the event. Topics define the type of the event and are used for matching (603) the event with the corresponding event subscribers (widget processes) accordingly. The properties attribute provides data related to the actual event. The event data is sent to all widget processes that subscribed to the topic of the event. In case of a asynchronous event, the EventAdmin unit initiates (604) asynchronous delivery of the event, wherein delivery of a next event is initiated regardless of the success of previous event delivery. In case of a synchronous event, the EventAdmin unit initiates (605) synchronous delivery of the event, wherein delivery of a next event is initiated upon successful delivery of the event.

The CommandAdmin unit 413 handles commands (e.g. widget execute command, information requests, commands related to financial transactions associated with the widgets, etc.) using a request-response model. The CommandAdmin unit 413 dispatches commands between Command Executors and Command Requesters, as will be described in detail below, by interposing a command channel. Command Executors post commands to the command channel, and the command channel defines which requesters need to be executed. Thus, publishers and handlers have no direct knowledge of each other.

CommandAdmin unit 413 is operable to enable transferring commands to and from the game platform via the service interface 402 (e.g. commands to and from the back-end unit 303 for debiting and/or crediting each user's financial account).

Referring now to FIG. 7, there is provided a generalized flowchart of the transaction process in accordance with certain embodiments of the presently disclosed subject matter. In case that a financial transaction is initiated by a widget process (command requester), the corresponding financial transaction request is received (701) by the widget interface 401 and forwarded (702) to the CommandAdmin unit 413 within the processing module 403. The financial transaction request is then forwarded (703) to the back-end services unit 303 (command executor) via the service interface 402. The back-end services unit 303 executes (704) the transaction command and updates the client's balance account accordingly. The back-end services unit 303 then sends (705), via the service interface 402, confirmation data to the CommandAdmin unit 413, which forwards (706) the transaction data to the respective widget process via the widget interface 401.

Optionally, the widget manager can further communicate with a player via the UI 12, thus enabling a player's involvement in the transaction flow (e.g. for confirmation of the financial transaction requests and/or for receiving confirmation of transactions and transaction-related information).

Optionally, the financial transaction process can further involve a widget services unit (not shown). The widget service unit can be a part of the widget manager 312, the game platform 301 and/or a standalone unit. For example, the widget services unit can receive from the back-end services unit 303 and store all transaction-related data relevant to the widgets.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A computer configured to operate in conjunction with a game platform via a client communication channel and comprising a processing unit operatively coupled to a memory having a widget manager installed thereon, the widget manager configured for managing at least one widget process and comprising a processing module, a widget interface and a service interface operatively coupled to each other,
   wherein said at least one widget process is configured to run on the processing unit as a part of a client process running on the processing unit, said client process configured to communicate with the game platform and/or parts therein via the client communication channel;
   wherein the widget interface is configured to enable communication between said at least one widget process and a game process which is configured to run on the computer as a part of said client process independently from the widget process; and
   wherein the service interface is configured to enable communication between said at least one widget process and the game platform and/or parts therein.

2. The computer of claim 1, wherein the service interface is configured to enable communication between said at least one widget process and the game platform and/or parts therein via said client communication channel.

3. The computer of claim 1, wherein the widget interface is configured to enable communication between said at least one widget process and said game process using publish/subscribe events, and wherein said game process is configured to act as a publisher and said at least one widget process is configured to act as a subscriber.

4. The computer of claim 1 wherein the service interface is configured to enable communication between said at least one widget process and the game platform and/or parts therein using request/respond commands, and wherein said at least one widget process is configured to act as a requester and the game platform and/or parts therein are configured to act as one or more executors.

5. The computer of claim 1, wherein the widget interface comprises at least one application programming interface (API) selected from a group comprising:
   pull API configured to enable asking and/or calling certain functionality;
   push API configured to enable registering on one or more predefined events;
   get API configured to enable the widget process requesting information related to the game process; and
   set API configured to enable the widget process to transfer commands via the service interface.

6. The computer of claim 1, wherein the service interface comprises at least one application programming interface selected from a group comprising:

command API configured to send and receive real time commands related to financial transactions associated with the widget process;

secured channel API configured to enable communication with the game platform and/or parts therein via a secure channel; and real time channel API configured to enable communication with the game platform and/or parts therein via a real time channel.

7. A method of managing a client process which runs on a processing unit and communicates with a game platform and/or parts therein via a client communication channel; the method comprising running a game process as a part of said client process;

running at least one widget process as a part of said client process, wherein said at least one widget process runs independently from the game process;

communicating between said at least one widget process and said game process merely via a widget interface accessible by said game process and said at least one widget process; and communicating between said at least one widget process and said game platform and/or parts therein via said client communication channel.

8. The method of claim 7, wherein communicating between said at least one widget process and said game process is provided using publish/subscribe events, and wherein the game process acts during communicating as a publisher and said at least one widget process acts during communicating as a subscriber.

9. The method of claim 7 wherein communicating between said at least one widget process and the game platform and/or parts therein is provided using request/respond commands, and wherein said at least one widget process acts during communicating as a requester and the game platform and/or parts therein act during communicating as one or more executors.

10. The method of claim 7, wherein said widget interface comprises at least one application programming interface (API) selected from a group comprising:

pull API configured to enable asking and/or calling certain functionality;

push API configured to enable registering on one or more predefined events;

get API configured to enable the widget process requesting information related to the game process; and set API configured to enable the widget process to transfer commands via the service interface.

11. The method of claim 7, wherein communicating between said at least one widget process and the game platform and/or parts therein comprises sending and receiving real time commands related to financial transactions associated with the widget process.

12. The method of claim 7, wherein communicating between said at least one widget process and the game platform and/or parts therein is provided via a secure channel.

13. The method of claim 7, wherein communicating between said at least one widget process and the game platform and/or parts therein is provided via a real time channel.

14. A computer program product comprising a non-transitory computer useable medium having computer readable program code embodied therein for managing a client process which runs on a processing unit and communicates with a game platform and/or parts therein via a client communication channel, the computer program product comprising:

computer readable program code for causing the processing unit to run a game process as a part of said client process;

computer readable program code for causing the processing unit to run at least one widget process as a part of said client process, wherein said at least one widget process runs independently from the game process;

computer readable program code for causing the processing unit to enable communicating between said at least one widget process and said game process merely via a widget interface accessible by said game process and said at least one widget process; and computer readable program code for causing the processing unit to enable communicating between said at least one widget process and said game platform and/or parts therein via said client communication channel.

15. The method of claim 7 wherein the widget interface is implemented as a part of said client process.

* * * * *